(No Model.)

G. GLIDDEN.
COMBINED HAND PLOW, PLANTER, AND CULTIVATOR.

No. 273,229. Patented Feb. 27, 1883.

WITNESSES:
Henry N. Miller
C. Sedgwick

INVENTOR:
G. Glidden
BY Munn & Co
ATTORNEYS.

UNITED STATES PATENT OFFICE.

GREENLIEF GLIDDEN, OF BUCHANAN, MICHIGAN, ASSIGNOR OF ONE-HALF TO HORACE S. BLACK, OF SAME PLACE.

COMBINED HAND PLOW, PLANTER, AND CULTIVATOR.

SPECIFICATION forming part of Letters Patent No. 273,229, dated February 27, 1883.

Application filed July 8, 1882. (No model.)

*To all whom it may concern:*

Be it known that I, GREENLIEF GLIDDEN, of Buchanan, in the county of Berrien and State of Michigan, have invented a new and Improved Combined Hand Plow, Planter, and Cultivator, of which the following is a full, clear, and exact description.

Reference is to be had to the accompanying drawings, forming part of this specification, in which similar letters of reference indicate corresponding parts in all the figures.

Figure 1:
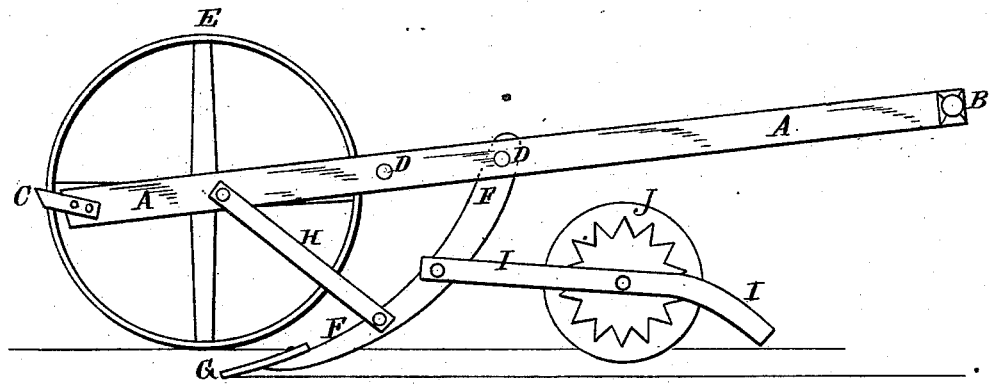
Figure 2:
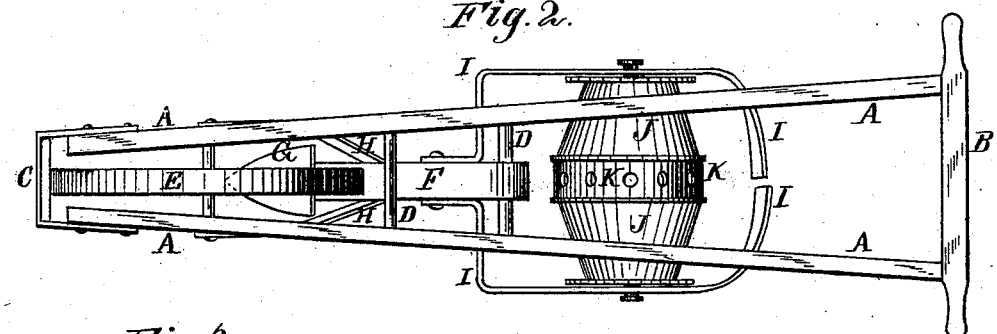
Figure 3:
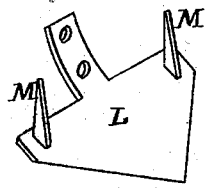
Figure 4:
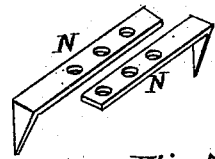
Figure 5:
Figure 6:
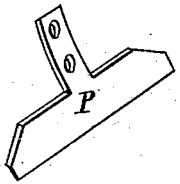
Figure 7:
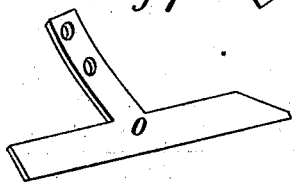

Figure 1 is a side view of my improved machine arranged as a planter. Fig. 2 is a top view of the same. Fig. 3 represents a device for cutting up old rows of strawberry-plants. Fig. 4 represents a device for cutting off the runners of strawberry-plants. Fig. 5 represents a plate for attachment to the plow-standard. Fig. 6 represents a device for cutting up weeds. Fig. 7 represents a device for cutting up weeds and throwing soil around the plants.

The object of this invention is to furnish an improved hand-machine designed especially for use in gardening for marking the ground, planting or drilling the seed, covering the seed, and cultivating the plants, and which shall be simple in construction, convenient in use, and effective in operation.

A A are two bars, connected at their rear ends by a round, B, which serves as a handle in propelling the machine. The two bars A incline toward each other, and are connected at their forward ends by a brace-bar, C. The two bars A are also connected by one or more brace bars or rounds or cross-bars, D.

To and between the bars A, at a little distance from their forward ends, is journaled a wheel, E. To one of the rounds or cross-bars D, in the rear of the wheel E, is attached the upper end of the standard F, to the lower end of which, directly in the rear of the wheel E, is attached the plow-plate G. The standard F is bent forward, and the draft-strain upon it is sustained by the braces H, the lower ends of which are attached to the lower part of the said standard, and their upper ends are attached to the bars A. The plow-plate G is a shovel-plow, and is designed for use for marking the ground, opening furrows to receive seed, and similar work.

When the machine is to be used for planting or drilling seed, the forward ends of the two bars I are pivoted to the opposite sides of the middle part of the standard F. The bars I are bent outward, and then rearward, and to and between their middle parts are journaled the ends of the dropping-cylinder J, which is made in the form of a barrel, except that it has a larger bilge.

Around the middle part of the cylinder J is formed a row of holes, through which the seed escapes to the ground. The size of the dropping-holes in the cylinder J is regulated by a band, K, passed around the middle part of the said cylinder J, and provided with holes corresponding in position, size, and number with the holes in the cylinder J, so that by adjusting the band K the discharge-holes may be regulated in size or wholly closed, as may be desired. The band K is kept from lateral movement by flanges or ribs formed upon or attached to the cylinder J at the sides of the said band K. The rear ends of the bars I are bent inward, inclined downward, and slightly twisted, to adapt them to act as coverers to scrape soil into the furrow, and thus cover the seed.

L is a plate made triangular in form, and provided with a shank to receive the bolts by which it is secured to the plow-standard F. To the side corners of the plate L are attached two upwardly-projecting knives, M, as shown in Fig. 3. The device L M is designed to be run beneath old rows of strawberry-plants to destroy them, the knives M cutting off the runners at the sides of the said row.

N are two bars, having their outer ends bent downward and sharpened upon the forward edge. The inner ends of the bars N are overlapped, and have a number of holes formed through them to receive the bolt by which they are secured to the standard F, so that they can be expanded and contracted as may be desired. The device N is designed for cutting off the runners of the strawberry-plants without disturbing the plants.

O is a narrow transverse plate, having a shank upon its rear side, provided with perforations to receive the bolts by which it is secured to the standard F. The plate O is set at a slight inclination with its shank, and is designed to cut off the weeds and at the same time throw soil around the plants.

P is a narrow plate, having a shank upon the middle part of its rear edge, provided with holes to receive the bolts by which it is secured to the standard F. The plate P is set at right angles with its shank, and is designed for cutting off weeds without moving the soil.

Q is a small rectangular plate, provided with a hole in its center to receive the bolt by which it is secured to the standard F. The plate Q is designed to be used in connection with the shanks of the various plates for adjusting them on the standard F.

If desired, a dovetailed groove may be formed in the lower part of the standard F, to receive the shanks of the various tools, for convenience in attaching and adjusting them and to hold them more firmly in place.

Having thus described my invention, I claim as new and desire to secure by Letters Patent—

In a seeder, the parallel bars I I, formed of continuous strips pivoted to the standard F and bent downward and backward to serve as coverers, in combination with the cylindrical hopper J, journaled between said strips, substantially as set forth and shown.

GREENLIEF GLIDDEN.

Witnesses:
ALFRED RICHARDS,
O. E. WOODS.